United States Patent [19]

Peterson et al.

[11] 4,286,827
[45] Sep. 1, 1981

[54] CYLINDRICAL ELASTOMERIC BEARING

[75] Inventors: Robert R. Peterson, Hudson; Daniel S. Ventura, Malden, both of Mass.

[73] Assignee: Barry Wright Corporation, Watertown, Mass.

[21] Appl. No.: 83,598

[22] Filed: Oct. 11, 1979

[51] Int. Cl.³ .............................................. F16C 27/06
[52] U.S. Cl. .................................. 308/26; 267/141.1; 308/237 R
[58] Field of Search ............... 267/140.4, 141.1, 141.2; 308/2 R, 26, 37, 237 R, 237 A, DIG. 8

[56] References Cited

U.S. PATENT DOCUMENTS

| | | | |
|---|---|---|---|
| 3,679,197 | 7/1972 | Schmidt | 308/26 |
| 4,105,266 | 8/1978 | Finney | 308/237 R |

Primary Examiner—Frederick R. Schmidt
Attorney, Agent, or Firm—Milton E. Gilbert; Gary E. Ross

[57] ABSTRACT

A cylindrical elastomeric bearing for carrying relatively large compressive radial loads while accommodating thrust and torsional loads acting along the bearing's longitudinal axis. The bearing generally comprises a rigid interior member and a rigid exterior member, with the two members being joined together by bonded concentric laminae comprising alternating strata of resilient material and non-extensible material. The fatigue life of the bearing is enhanced by forming each resilient stratum with a shear modulus of elasticity such that the stratum will tend to carry a strain substantially equal to the strain carried by every other resilient stratum when the bearing is subjected to a wide range of different torsional loads. The desired shear moduli of elasticity are attained for the different resilient strata over a wide range of different torsional loads by forming at least some of the resilient strata from two or more substrata of selected thicknesses wherein each substratum within a given resilient stratum comprises a resilient material having a unique shear modulus.

11 Claims, 2 Drawing Figures

CYLINDRICAL ELASTOMERIC BEARING

This invention relates to laminated bearings in general, and more particularly to cylindrical elastomeric bearings of the type adapted to accommodate relatively large compressive loads in the radial direction.

BACKGROUND OF THE INVENTION

It is generally well known that the compressive load-carrying capacity of a piece of resilient material may be increased many times over by subdividing the resilient material into a plurality of strata which are perpendicular to the compressive load and separating these strata with intervening strata of non-extensible material. At the same time, however, it has been found that the ability of the resilient material to yield in a direction parallel to the strata remains substantially unaffected.

This concept has been employed in a wide variety of bearing configurations. See, for example, the following U.S. Pat. Nos. and the prior art cited therein: Finney, 4,105,266; Finney, 4,040,690; Johnson, 3,807,896; Peterson, 3,792,711; Dolling, 3,941,433; Schmidt, 3,679,197; Lee et al, 3,429,622; Boggs, 3,377,110; Orain, 2,995,907; Krotz, 3,179,400; Hinks, 2,900,182; and Woldhaber, 2,752,766.

One important elastomeric bearing configuration is the cylindrical bearing. This bearing utilizes a design whereby alternating strata of a resilient material and strata of a non-extensible material are formed as surfaces of rotation about a common central axis, with successive strata being disposed at successively increasing radii from the axis. Such bearings have proven quite useful in applications which require a bearing for carrying relatively large compressive loads in a direction perpendicular to the axis while accommodating some thrust and torsional loads acting on or about the axis.

Experience with such cylindrical bearings has shown that where each resilient stratum in the laminated bearing is formed of equal length, thickness and modulus of elasticity, prolonged use of the bearing in accommodating cyclic torsional movement generally results in fatigue failure in the innermost resilient stratum before similar fatigue failure occurs in the other resilient strata. This preferential fatigue failure is caused by the greater torsional shear strains established in the innermost resilient stratum during torsional movement. As a result, the fatigue life of such a cylindrical bearing is typically determined by the torsional shear strains established in the innermost resilient stratum during bearing use.

This may be better understood by considering that, as is well known in the art (see U.S. Pat. No. 3,679,197), the torsional shear strain carried by any given resilient stratum in an elastomeric bearing in a given torsional load application is an inverse function of the product of the stratum's effective surface area (A) carrying the torsional load applied perpendicular to the surface area, the average radius (R) from the common center axis to that surface area and the shear modulus of elasticity (G) of the resilient material. More specifically, $$K = RAG \quad (1)$$

where $K$ = a constant established for the inner layer and used for calculation of remaining layer shear moduli. Thus it will be seen that in the case of a cylindrical elastomeric bearing which has each resilient stratum formed of the same material (i.e. where each resilient stratum has the same shear modulus of elasticity), the strain induced by cyclic torsional movement will be greatest in the innermost resilient stratum due to its smallest radius R and its smallest surface area A. As a result, the innermost resilient stratum is typically the first to fail from prolonged torsional movement when the laminated bearing has resilient strata of equal lengths, thicknesses and shear moduli of elasticity.

One solution to this failure problem was advanced in U.S. Pat. No. 3,679,197. Specifically, in order to provide torsional shear strains across the inner resilient strata which are equal to or approaching the strains across the outer strata, the patentee Schmidt suggests varying the elastomer stock used in each stratum so as to provide each stratum with a different shear modulus of elasticity, in order that the strain across each resilient stratum may be equalized under a given torsional load. In this connection it should be noted that for a laminated bearing of cylindrical cross-section and length L, the ratio of the strain across a stratum i for a given torsional load to the strain across a stratum j for the same torsional load is made equal to one, so that the strains in each stratum are made equal to one another. Putting this in terms of Eg. (1) above, we have $$\frac{\text{strain } i}{\text{strain } j} = \frac{\frac{K}{R_i A_i G_i}}{\frac{K}{R_j A_j G_j}} = 1 \quad (2)$$

or $$\frac{\text{strain } i}{\text{strain } j} = \frac{R_j A_j G_j}{R_i A_i G_i} = 1 \quad (3)$$

or $$\frac{\text{strain } i}{\text{strain } j} = \frac{R_j(2\pi R_j L) G_j}{R_i(2\pi R_i L) G_i} = 1 \quad (4)$$

or $$\frac{\text{strain } i}{\text{strain } j} = \frac{r_j^2 G_j}{R_i^2 G_i} = 1 \quad (5)$$

or $$\frac{G_i}{G_j} = \frac{R_j^2}{R_i^2} \quad (6)$$

Thus, the strain across any strata i and j will be made equal if the shear modulus of elasticity of the strata varies inversely as the square of the mean radius of the respective area. The patentee Schmidt also states that it is advantageous to progressively increase the thickness of the resilient strata as the radius increases. By progressively increasing the thickness of the strata with increasing radius, Schmidt suggests that more resilient material can be made available within each resilient stratum to help distribute torsion-induced strain while still keeping the compressive stresses within allowable limits. Thus, Schmidt concludes that by both progressively increasing the thickness and progressively decreasing the shear modulus of elasticity of each stratum with increasing radius, optimum bearing design can be achieved.

However, the approach advocated in U.S. Pat. No. 3,679,197 leads to two principle sets of problems, one associated with changing the shear modulus of elasticity for each of the resilient strata and one associated with increasing the thickness of each stratum with increasing radius. Varying the shear modulus of elasticity for each resilient stratum tends to lead to the following problems, among others. First, the patentee's method of achieving a different shear modulus of elasticity for each resilient stratum is expensive in that it requires that each stratum be made of a different elastomeric material. Thus, an elastomeric bearing consisting of fifteen resilient strata would require fifteen different elastomer materials. While the production of these different elastomer materials may be achieved by subdividing a basic elastomer feedstock into fifteen different lots and modifying each lot with a different amount or type of additive, the fact remains that it is costly, time-consuming and inconvenient to provide a different material for each resilient stratum. Second, use of a relatively large number of elastomer materials as suggested by Schmidt is also disadvantageous where the bearings are to be used at relatively low temperature, e.g. −45° to 0° F. This is due to the fact that elastomer stocks tend to behave differently as the temperature is lowered. Thus, in a bearing made according to Schmidt only some of the elastomeric strata may work effectively while the bearing is cold, thereby inhibiting proper bearing performance and accelerating bearing deterioration due to the uneven strains created in the various resilient strata. Third, since each different elastomeric material tends to exhibit unique changes in its shear modulus of elasticity over a range of torsional shear strain magnitudes, formation of each resilient stratum from a single, unique elastomer material tends to provide a bearing which will equalize the strains within each resilient stratum only for a small range of strain magnitudes. However, if the strain magnitudes vary substantially, the shear moduli of each elastomer also will tend to vary substantially and the different strata will no longer experience substantially equal torsional shear strains. Thus, as the bearing of Schmidt is subjected to a wide range of torsional loads, the torsional shear strains in each resilient stratum will tend to differ from the strains created in other resilient strata, so that preferential fatigue will tend to take place once again.

Regarding the second set of problems associated with the approach advocated by Schmidt, increasing the thickness of each resilient stratum as the radius is increased will lead to a reduced number of laminae within the bearing if the overall bearing diameter is kept constant. This may be advantageous in certain applications. Nevertheless the reduction in the number of laminae tends to significantly reduce the compressive loads which can be accommodated perpendicular to the laminae.

OBJECTS OF THE PRESENT INVENTION

It is therefore a principle object of the present invention to provide an improved laminated bearing which substantially overcomes the above-noted problems of the prior art bearings.

More specifically, an object of the present invention is to provide an improved cylindrical bearing for carrying relatively large compressive radial loads while accommodating thrust and torsional loads along the bearing's longitudinal axis, whereby each strata of resilient material contained between adjacent strata of non-extensible material will carry a substantially equal strain, from stratum to stratum, in response to a wide range of varying torsional loads.

Another specific object of the present invention is to provide an elastomeric bearing in which at least some of the resilient strata are comprised of at least two substrata, with each substratum within a given strata comprising a resilient material having a unique shear modulus of elasticity, in order that torsional shear strains established within each resilient strata can be made substantially equal to the strains in the other strata for a wide variety of different torsional loads.

Yet another specific object of the present invention is to provide a bearing of the type and for the purpose described which requires fewer different resilient stocks than the number of resilient strata contained in the laminated elastomeric bearing.

SUMMARY OF THE INVENTION

These and other objects of the invention are addressed by providing a cylindrical laminated elastomeric bearing which is capable of carrying relatively large compressive radial loads while accommodating thrust and torsional loads acting along the bearing's longitudinal axis, the bearing essentially comprising a rigid interior member and a rigid exterior member, with the two members being joined together by bonded concentric laminae comprising alternating strata of resilient material and non-extensible material. The fatigue life of the bearing is enhanced by forming each resilient stratum with a shear modulus of elasticity such that the stratum will carry a torsional shear strain substantially equal to the torsional shear strain carried by every other resilient stratum when the bearing is subjected to a wide range of different torsional loads. The desired shear moduli of elasticity are attained for the different resilient strata over a wide range of different torsional loads by forming at least some of the resilient strata from two or more substrata of selected thicknesses wherein each substratum within a given resilient stratum comprises a resilient material having a unique shear modulus.

DESCRIPTION OF THE DRAWINGS

Still other features and many attendant advantages of the invention will be rendered obvious by the following detailed description of the preferred embodiment, which is to be taken in conjunction with the accompanying drawings wherein.

DETAILED DESCRIPTION OF THE PRESENT INVENTION

Figure 1:
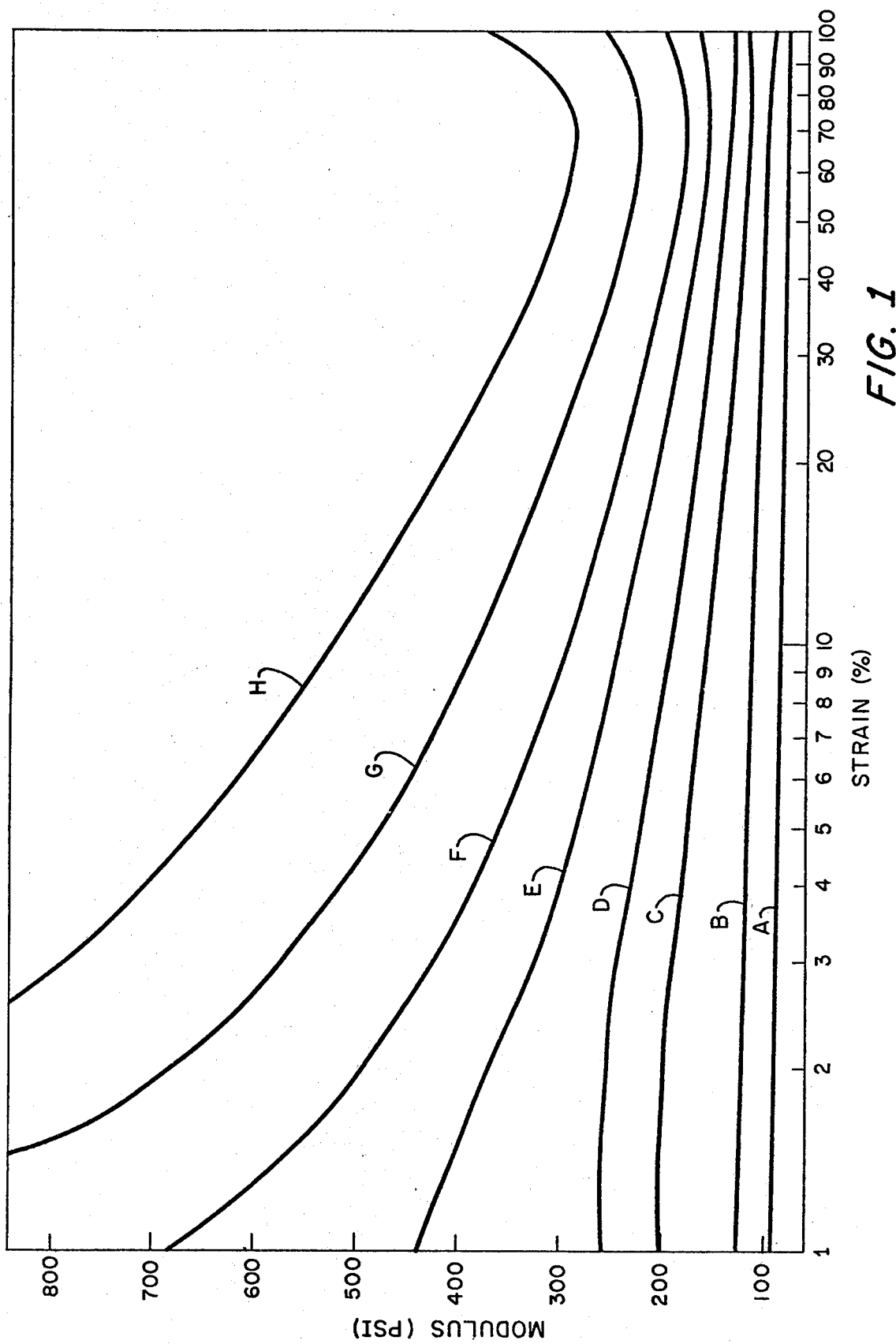
FIG. 1 is a family of curves illustrating the change which takes place in the shear modulus of elasticity of different elastomer stocks as the strain experienced by the stocks is changed.

FIG. 1 illustrates how the shear modulus of elasticity of a number of different elastomer compounds can vary in accordance with the strain experienced by each elastomer. These curves were derived by subjecting specimens of each compound to displacements only in shear at 75° F. while the specimens where free of compressive loading. The several compounds were derived from a single basic rubber stock and were produced by adding differing amounts of carbon to the basic stock.

As is apparent from a comparison of Curve A with Curves G or H, a relatively soft (low modulus) material can accommodate varying degrees of strain with less effect on its shear modulus than can a relatively stiff (high modulus) material. Thus, for example, at 50% strain the differences between the shear moduli of the compounds represented by Curves A and G or H is substantially less than it is at 5% strain. Stated another way, the higher a strain which it experiences, the more an elastomer with a relatively high shear modulus tends to behave like an elastomer with a relatively low shear modulus.

The present invention takes advantage of the behavior characteristics represented in FIG. 1 by making an elastomeric bearing in which at least some of resilient strata are formed from a combination of concentric differing substrata, where each substrata within a given resilient stratum comprises a resilient material having a unique shear modulus of elasticity. In this way, by concentrically combining a plurality of different substrata in varying thicknesses so as to form each stratum, a stratum can be produced which has a relatively constant shear modulus for a wide variety of torsional shear strain inputs. Thus it will be seen that by properly selecting and proportioning the substrata within the various strata, a bearing can be produced in which each strata bears a substantially equal strain for a variety of torsional loads.

In particular, it has been found that a bearing can be produced using as few as two different substrata per stratum which will yield excellent strain equalization throughout its resilient strata. In such a case, one substratum is formed from a resilient material which exhibits relatively small changes in shear modulus over a wide range of strain magnitudes and the other substratum is formed from a resilient which exhibits relatively large changes in shear modulus over a wide range of strain magnitudes. By appropriately proportioning the relative thicknesses of each substratum layer within each stratum, it is possible to provide a bearing which utilizes only two different resilient materials and which still yields substantially similar strains in each strata for a wide range of toriosnal loads.

Figure 2:
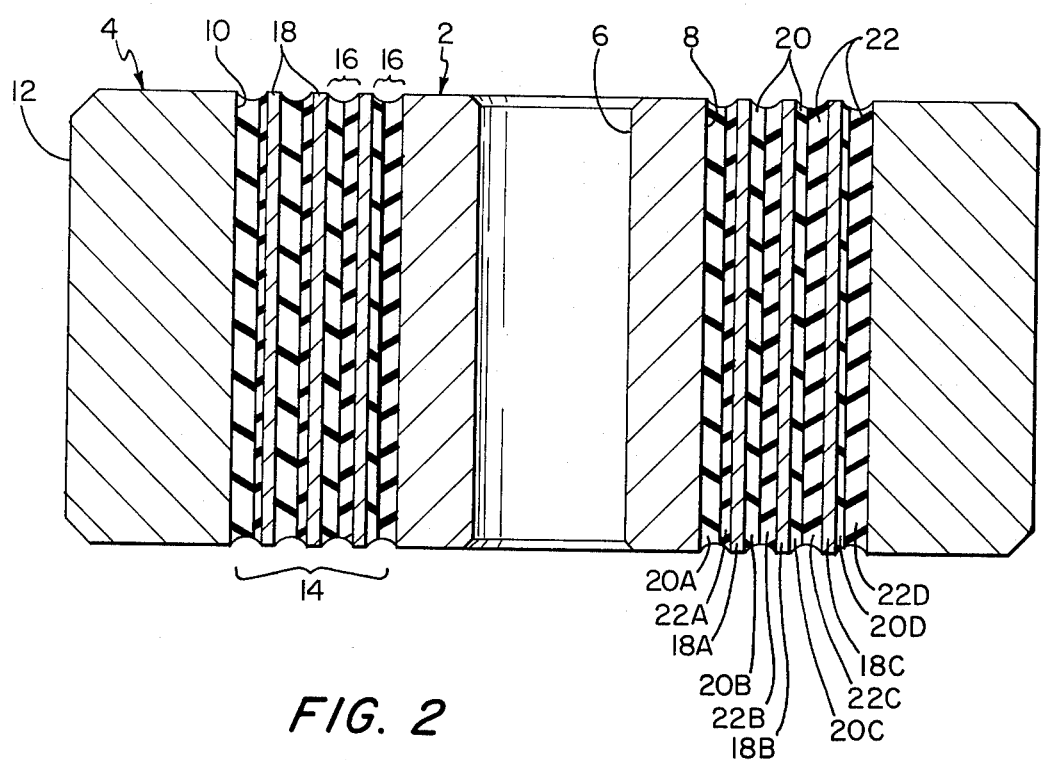
FIG. 2 is a longitudinal sectional view of the components of a cylindrically-shaped bearing assembly made in accordance with this invention as the components appear prior to molding and the bonding of the resilient materials to the associated metal parts.

FIG. 2 illustrates a particular embodiment for a cylindrical laminated bearing made in accordance with the present invention. The bearing is made by providing a rigid interior annulus 2 and a rigid exterior annulus 4, with the annuli 2 and 4 being coplanar and concentric with one another. Annulus 2 has an interior wall 6 and an exterior wall 8, and annulus 4 has an interior wall 10 and an exterior wall 12. The interior wall 10 of annulus 4 lies parallel to but spaced apart from the exterior wall 8 of annulus 2.

Disposed between walls 8 and 10 are a series of laminae 14. Laminae 14 are generally comprised of alternating resilient strata 16 and non-extensible strata 18. Each strata 16 is made of elastomeric material and comprises a pair of resilient substrata 20 and 22. Substratum 20 is comprised of a first elastomeric material having a relatively higher modulus of elasticity and substratum 22 is comprised of a second elastomeric material having a relatively lower modulus of elasticity. Substrata 20 and 22 are preferably formed from natural or synthetic rubber, though they may also be formed from suitable plastic elastomers. The non-extensible strata 18 may be formed of steel or another kind of non-extensible metal (e.g. aluminum or titanium) or even sheets of fiberglass or reinforced plastic.

Still referring to FIG. 2, the bearing is assembled by laying the first, or innermost, resilient substratum 20A up against the exterior wall 8 of the interior annulus 2. Next the resilient substratum 22A is laid up against substratum 20A. Then the non-extensible stratum 18A is placed over substratum 20A. Resilient substratum 20B is laid up against the non-extensible stratum 18A, and the resilient substratum 22B is placed over substratum 20B. Then the non-extensible stratum 18B is placed over the resilient substratum 22B. This process continues until a substratum 22D is laid up so as to contact both the resilient substratum 20D and the right interior wall 10 of the exterior annulus 4.

Once this is done the assembled parts are forced together in a mold under heat and pressure so as to cause the various resilient substrata 20 and 22 to bond to each other and also to bond to adjacent non-extensible stratum 18 or the exterior wall 8 or the interior wall 10, as the case may be. In this way the two resilient substrata 20 and 22 will be united together in such a way as to form a plurality of single resilient strata 16 which will have a structural integrity such that it will exhibit a modulus of elasticity different from but related to the shear moduli of elasticity of the substratum 20 and the substratum 22. Thus it will be seen that by selectively controlling the composition of substrata 20 and 22 and the relative thicknesses of substrata 20 and 22 within any resilient stratum 16, the modulus of elasticity of the stratum 16 can be selectively varied. By forming the stratum 16 from a varying blend of substrata 20 and substrata 22, a desired modulus of elasticity can be achieved for any stratum 16. In addition, it will be noted that if one substratum is formed of a material which has characteristics similar to the Curve A of FIG. 1 and one substratum is formed of a material similar to a curve G or H of FIG. 1, a series of strata can be provided which can yield a substantially constant shear strain distribution over a wide range of operating strain magnitudes.

As is apparent from FIG. 2, the relative thicknesses of the resilient substrata 20 and 22 varies according to the radial position of the substrata within the bearing itself. In general, the resilient substratum 20 (having a relatively higher modulus of elasticity) has a thickness which progressively decreases with increasing radius, so that substratum 20A has a greater thickness than substratum 20B and so on. Simultaneously, the resilient substrata 22 (having a relatively lower modulus of elasticity) has a thickness which progressively increases as its radial position moves outward, so that the substratum 22A has a lesser thickness than layer 22B and so on. Thus it will be apparent that the thickest substratum 20 will be that substratum 20 which contacts the exterior surface 8 of the interior annulus 2, i.e. substratum 20A, and the thickest substratum 22 will be that substratum which contacts the interior surface 10 of exterior annulus 4, i.e. substratum 22D. At the same time, it will be appreciated that the thinnest substratum 20 will reside next to the thickest substratum 22 and the thinnest substratum 22 will reside next to the thickest substratum 20. This is because at the inner radial positions the strata 16 will need to exhibit a modulus of elasticity closer to the modulus of elasticity of substratum 20 (i.e. a higher modulus of elasticity) and at the outer radial positions the strata 16 will need to exhibit a modulus of elasticity closer to the modulus of elasticity of substratum 22 (i.e. a lower modulus of elasticity) if the various strata 16 are to carry substantially equal strains in each strata. The precise thicknesses of substrata 20 and 22 within each stratum 16 is determined according to a computer finite element analysis which takes into account the moduli of elasticity of the substrata 20 and 22, the thickness of the non-extensible stratum 18 and the loads which one expects the bearing to accommodate, in order that a substantially equal strain will be carried by the several strata 16 over the range of loads anticipated.

It is to be appreciated that during the molding of the bearing additional elastomer material may be introduced into the mold for the purposes of developing sufficient molding pressure, filling in whatever gaps may exist between the various sections of resilient material and bringing the elastomeric layers to full size. This filler material preferably has a modulus of elasticity equal to the modulus of elasticity of the substratum 22, although an elastomer of higher or lower modulus may also be used. In any event, the filler elastomer material will comprise about 15% or less of the volume of each elastomeric strata in the bearing.

The method of bearing manufacture described above is especially suitable where the resilient stocks used in substrata 20 and 22 are elastomers which can be fused and molded under heat and pressure. Where the resilient stocks comprise a rubber, the bonding step also includes vulcanization. Other aspects of this procedure for assembling and bonding the array of resilient substrata 20 and 22, the non-extensible strata 18 and the bearing members 2 and 4 are well known to persons skilled in the art and are not described herein in detail since they are old and form no part of the present invention. EXAMPLE A cylindrical elastomeric bearing having four elastomeric strata as shown in FIG. 2 may be constructed according to the present invention wherein the elastomer strata 16 and the strata 18 have thicknesses of 0.08 and 0.03 inch respectively and the substrata comprising each stratum 16 have widths in inches as follows:

| STRATUM | WIDTH |
|---------|-------|
| 20A | .072 |
| 22A | .008 |
| 20B | .036 |
| 22B | .044 |
| 20C | .016 |
| 22C | .064 |
| 20D | .004 |
| 22C | .076 |

In this bearing the substratum 20 might have a shear modulus of elasticity of 240 psi and the substratum 22 might have a shear modulus of elasticity of 70 psi. The inner wall 10 of exterior annulus 4 might have a diameter of 1.82 inches and the outer wall 12 might have a diameter of 2.00 inches. The outer wall 8 of inner annulus 2 might have a diameter of 1.00 inches.

A bearing constructed according to the foregoing example will have an overall axial thrust stiffness of 1720 lb/in, an overall torsional stiffness of 14.50 in-lb/degrees and substantially equalized shear strains in the resilient strata over a wide range of torsional loads, e.g. ±1.0° to ±10.0°, thus assuring substantially uniform resilient strata deterioration under a variety of cyclic torsional motion. In contrast, a bearing of like size made with a different elastomeric stock in each resilient strata would tend to show equalized shear strain for each strata only for a narrow range of cyclic torsional motion.

Obviously the arrangement shown in FIG. 2 is not the only possible way of practicing the present invention. Thus, it is conceivable that the stratum 16 closest to exterior wall 8 may be totally devoid of a substratum 22 (i.e. the innermost stratum 16 may be comprised only of a substratum 20). Similarly, the outermost stratum 16 contacting the interior wall 10 may be formed entirely of the substratum 22. It is also conceivable that three or more unique substrata may be used to form one or more of the resilient strata 16. It is also forseen that a bearing may be formed which has more or less laminae 14 than is shown in FIG. 2. Also contemplated is a bearing which has its members 2 and 4 in shapes other than annuli, e.g. where member 2 is a solid cylinder and where member 4 is a rectangular block having a central circular bore which has greater radius than the radius of member 2. Similarly, it is envisioned that one might form the bearing with injection molding techniques well known to persons skilled in the art. It is also envisioned that while the thicknesses of strata 16 appear constant in FIG. 1 throughout the bearing, regardless of radial position (that is, the sum of the widths of the variable substratum 20 and the variable substratum 22 is always the same regardless of the radial position of the resilient strata 16), it may be altered so that the thickness of strata 16 is not uniform throughout the bearing.

ADVANTAGES OF THE PRESENT INVENTION

It will be readily apparent to persons skilled in the art that one advantage of using the present invention in place of the prior art is that a bearing can be produced in which the resilient strata will carry substantially equalized torsional shear strains for a wide range of torsional motion, instead of for a relatively narrow range of motion. This results in substantially uniform resilient strata deterioration which tends to enhance the lifetime of the bearing.

Another advantage is that this equalized shear strain for wide ranges of torsional motion can be attained by using as few as two different elastomeric materials for forming the resilient strata. This results in decreased costs and increased production.

What is claimed is:

1. In a cylindrical elastomeric bearing comprising a rigid interior member and a rigid exterior member, wherein said interior and said exterior members are joined together by bonded concentric laminae comprising alternating strata of resilient material and non-extensible material disposed one about the other around a common axis, the improvement wherein at least some of said resilient strata are formed from two or more bonded cylindrical and concentric substrata disposed about each other and around said common axis, with each substratum within a given resilient stratum comprising a resilient material having a shear modulus of elasticity different from the shear modulus of elasticity of every other substratum within said resilient stratum, and the shear moduli of elasticity of the substrata in each resilient stratum being selected so that the said resilient strata have effective shear moduli of elasticity such that the torsional shear strains established within each resilient stratum are substantially the same as the strains established within every other resilient stratum for a given range of torsional loads.

2. A bearing according to claim 1 wherein all of said resilient strata are formed from two or more bonded resilient substrata of different elastomeric materials.

3. A bearing according to claim 1 wherein each of said resilient strata has the same number of substrata as every other resilient stratum.

4. A bearing according to claim 3 wherein each of said resilient strata is comprised of the same resilient materials as every other resilient stratum.

5. A bearing according to claim 4 wherein the resilient materials comprising each resilient stratum are disposed in the same radial sequence for each resilient substratum.

6. A bearing according to claim 5 wherein the thickness of each substratum within a given resilient stratum differs according to the radial position of the given resilient stratum.

7. A bearing according to claim 6 wherein the shear modulus of elasticity of each resilient stratum decreases with increasing radius.

8. A cylindrical elastomeric bearing having a central axis comprising a rigid interior member and a rigid exterior member joined together by bonded concentric laminae comprising alternating strata of resilient material and non-extensible material, each of said resilient strata being formed from two cylindrical, concentric, and bonded substrata each made of a resilient material having a shear modulus of elasticity different from the other, said substrata disposed one about the other and around the axis of the bearing, the size and material of said substrata being selected so that each of said resilient strata has an effective shear modulus of elasticity such that the torsional shear strains established within each resilient stratum are substantially the same as the strains established within every other resilient stratum over a wide range of different torsional loads.

9. A bearing according to claim 8 wherein one of said bonded substrata comprises a first resilient material having a relatively high shear modulus of elasticity and one of said bonded substrata comprises a second resilient material having a relatively low shear modulus of elasticity.

10. A bearing according to claim 9 wherein the shear modulus of elasticity of each resilient stratum decreases with increasing radius.

11. A bearing according to claim 10 wherein the thickness of each substratum of said first resilient material decreases with increasing radius and the thickness of each substratum of said second resilient material increases with increasing radius.

* * * * *